United States Patent
Gadepalli et al.

(10) Patent No.: US 10,262,010 B2
(45) Date of Patent: Apr. 16, 2019

(54) SCREEN CAPTURE DATA AMALGAMATION

(71) Applicant: International Business Machines Corporation, Armonk, NY (US)

(72) Inventors: Venkata V. Gadepalli, Apex, NC (US); Trudy L. Hewitt, Cary, NC (US); Ashok K. Iyengar, Encinitas, CA (US); James M. Moreno, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 15/341,176

(22) Filed: Nov. 2, 2016

(65) Prior Publication Data

US 2018/0121469 A1     May 3, 2018

(51) Int. Cl.
| | |
|---|---|
| *G06F 17/30* | (2006.01) |
| *G06F 17/27* | (2006.01) |
| *G06F 17/24* | (2006.01) |
| *H04L 12/58* | (2006.01) |

(52) U.S. Cl.
CPC ...... *G06F 17/30268* (2013.01); *G06F 17/241* (2013.01); *G06F 17/279* (2013.01); *G06F 17/2765* (2013.01); *H04L 51/16* (2013.01); *H04L 51/10* (2013.01)

(58) Field of Classification Search
CPC ........... G06F 17/30268; G06F 17/2765; G06F 17/279; G06F 17/241; G06F 17/30; G06F 17/24; G06F 17/27; G06F 3/0482; G06F 17/3084; H04L 51/16; H04L 51/10; H04L 12/58; H04L 67/06; G06T 11/206; H04W 21/4788; H04N 21/4788
See application file for complete search history.

(56) References Cited

U.S. PATENT DOCUMENTS

| | | | |
|---|---|---|---|
| 8,032,510 B2 | 10/2011 | Boerries et al. | |
| 9,129,327 B1 | 9/2015 | Cheung et al. | |
| 9,530,050 B1 * | 12/2016 | Erol ....................... | G06F 17/241 |
| | | | 715/808 |
| 2006/0242178 A1 | 10/2006 | Butterfield et al. | |

(Continued)

OTHER PUBLICATIONS

OSXDaily; How to See the Exact Location Where a Photo was Taken with a Mac, May 8, 2015.

(Continued)

*Primary Examiner* — Anh Ly
(74) *Attorney, Agent, or Firm* — Garg Law Firm, PLLC; Michael O'Keefe

(57) ABSTRACT

At a device of a sender, a screen capture image is captured from a first portion of data presented on the device by a data source. Historical messaging data is analyzed to compute a set of topics in which the sender has participated. Using a topic from the set of topics as a context, a second portion of the data presented on the device by the data source is searched to extract an additional information from the second portion, the additional information corresponding to the context. the additional information is associated with the screen capture image. The screen capture image and the additional information are caused to be transmitted in a messaging channel.

20 Claims, 6 Drawing Sheets

(56) References Cited

U.S. PATENT DOCUMENTS

| | | | |
|---|---|---|---|
| 2008/0086700 A1* | 4/2008 | Rodriguez | G06F 9/4443 715/804 |
| 2009/0152357 A1* | 6/2009 | Lei | G06F 17/30011 235/454 |
| 2009/0154778 A1* | 6/2009 | Lei | G06K 9/00456 382/112 |
| 2009/0171980 A1 | 7/2009 | Meadow et al. | |
| 2010/0098342 A1* | 4/2010 | Davis | G06K 9/0063 382/220 |
| 2010/0318541 A1* | 12/2010 | Golwalkar | G06F 17/30389 707/759 |
| 2011/0026828 A1* | 2/2011 | Balasubramanian | G06K 9/00449 382/187 |
| 2012/0209871 A1* | 8/2012 | Lai | H04L 51/02 707/769 |
| 2012/0210437 A1* | 8/2012 | Karande | G06F 21/54 726/26 |
| 2012/0221946 A1* | 8/2012 | Dovey | G06F 9/451 715/273 |
| 2014/0214693 A1* | 7/2014 | Mazzoleni | G06Q 10/101 705/300 |
| 2014/0253701 A1* | 9/2014 | Wexler | A61F 9/08 348/62 |
| 2014/0359415 A1 | 12/2014 | Song et al. | |
| 2015/0371613 A1* | 12/2015 | Patel | G06F 21/10 345/549 |
| 2016/0055246 A1* | 2/2016 | Marcin | G06F 17/30867 707/732 |
| 2016/0180162 A1* | 6/2016 | Cetintas | G06K 9/00456 706/20 |
| 2018/0032997 A1* | 2/2018 | Gordon | G06Q 20/3224 707/760 |

OTHER PUBLICATIONS

AskDifferent; Is picture location info retained when I share a photo?, 2012.

Oracle; Warehouse Builder Installation and Administration Guide, 2016.

Fieldtrip GB, Capture Data, 2013.

* cited by examiner

SCREEN CAPTURE DATA AMALGAMATION

TECHNICAL FIELD

The present invention relates generally to a method, system, and computer program product for capturing and sharing images from a screen. More particularly, the present invention relates to a method, system, and computer program product for screen capture data amalgamation.

BACKGROUND

A variety of data is presented on the display screens of a variety of devices. Technology exists to capture all or a portion of the presentation on the display screen in the form of an image. An image formed by capturing all or a portion of the data presented on a display screen is hereinafter referred to as a "screen capture image", "screen capture", or simply "image", unless expressly distinguished where used.

A screen capture image is essentially a picture taken of all or a portion of the screen. This picture can include anything or any data of any kind that is visibly presented on the screen at the time the screen capture image is captured or taken. For example, if a graphical rendering, a picture or imagery, textual data, interactive data, a scene of a video, a simulation, or some combination thereof is being visibly displayed on a portion of a screen at the instant of the capture, the screen capture image will include an image of such a display on such a portion at such an instant.

The graphical rendering, the picture or imagery, the textual data, the interactive data, the scene of a video, the simulation, or some combination thereof is collectively and interchangeably referred to herein as "presented data", "displayed data", or simply "data", unless expressly distinguished where used. Typically, a data source provides the presented data that is being visibly displayed on a portion of a screen at a given instant of the screen capture. As some non-limiting examples, that data source may be a Uniform Resource Locator (URL), a repository, a webserver, an application server, and the like.

SUMMARY

The illustrative embodiments provide a method, system, and computer program product. An embodiment includes a method that captures a screen capture image at a device of a sender, from a first portion of data presented on the device by a data source. The embodiment analyzes historical messaging data to compute a set of topics in which the sender has participated. The embodiment searches, using a topic from the set of topics as a context, a second portion of the data presented on the device by the data source. The embodiment extracts, responsive to the searching, an additional information from the second portion, the additional information corresponding to the context. The embodiment associates the additional information with the screen capture image. The embodiment causes the screen capture image and the additional information to be transmitted in a messaging channel.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
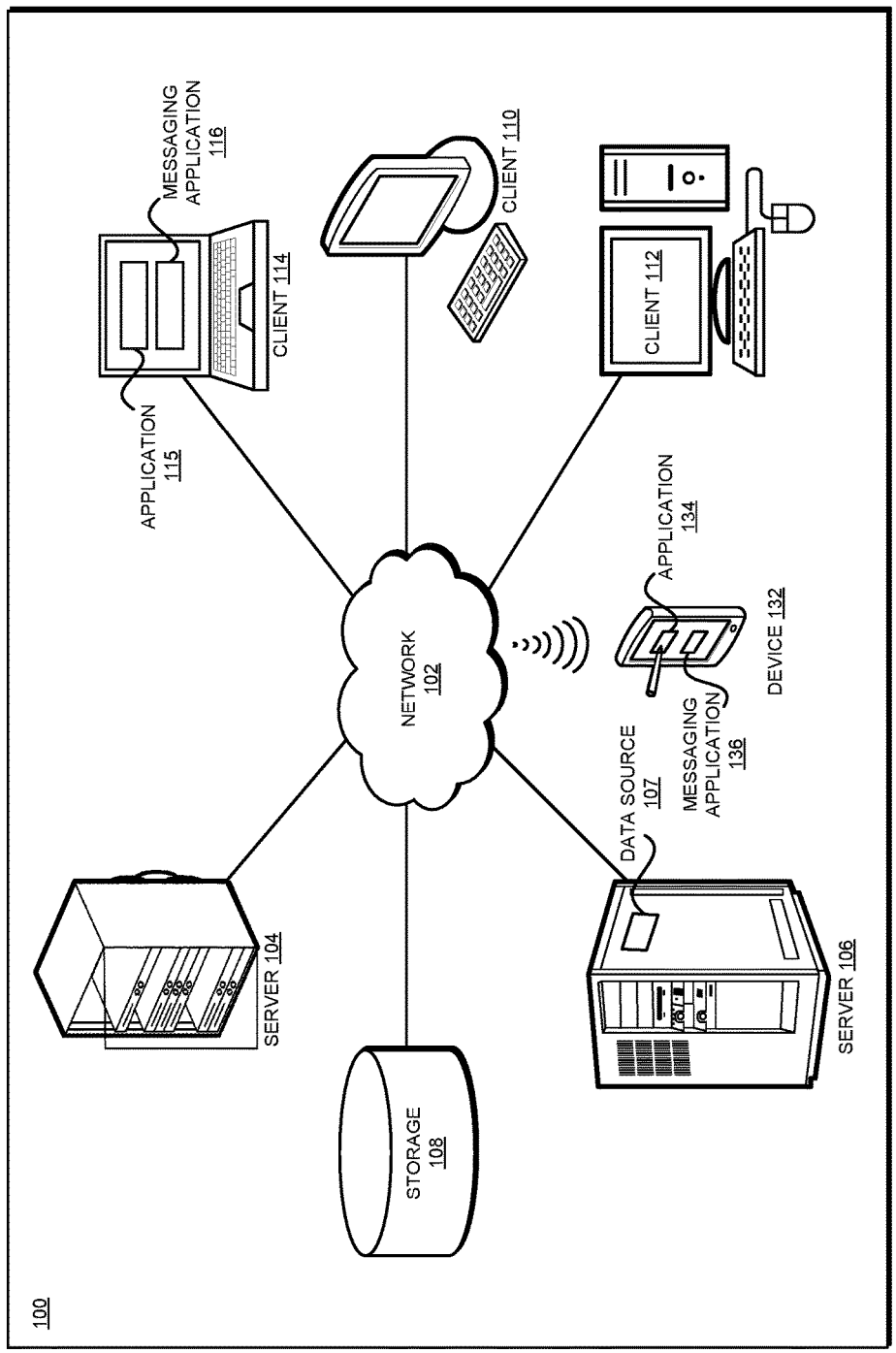
FIG. 1 depicts a block diagram of a network of data processing systems in which illustrative embodiments may be implemented.

The illustrative embodiments recognize that screen capture images provide a quick and easy way to share information with other users, but often do not provide the additional detail or information that a receiver of the screen capture might need in relation to the shared screen capture image. A typical use-case of messaging between users using screen capture images occurs as follows—one user captures a screen capture image and sends to a receiving user with or without any accompanying sender-supplied annotations. The receiving user often responds by asking the sender user one or more questions related to the image. The sender user then searches for the answers to the asked question and messages the receiver with the answer related to the image.

For example, Jane Doe might find a table lamp online on a retailer's website (a data source). The seller of the table lamp sends some presented data to Jane Doe's computer or device, the presented data includes the image and additional information about the lamp, such as the price, the size, the color, the materials used, any use restrictions, recommended wattage of bulbs, and so on. Jane Doe captures a portion of the screen, e.g., the portion where the lamp's picture is presented. Jane Doe sends to the screen captured image to John Doe via a suitable messaging channel.

A messaging channel is a method, application, system, or platform for electronic communication. Instant messaging apps or platforms, social media applications, and email are some non-limiting examples of a messaging channel within the scope of the illustrative embodiments.

In one use-case, John Doe receives the screen capture image and messages back to Jane Doe asking for the material used in making the lamp in the picture. Jane Doe revisits the retailer's website, finds (or does not find) an answer to John Doe's question, and responds accordingly to John Doe.

In another use-case, suppose that the screen capture image shows not only a lamp but also a picture frame placed adjacent to the lamp. While Jane Doe intends to share the picture for the lamp, John Doe is interested in the picture frame, and asks about the price of the picture frame. Jane Doe revisits the retailer's website, finds (or does not find) an answer to John Doe's question, and responds accordingly to John Doe.

It is possible that Jane and John Doe may have been communicating previously about decorating a living area. Therefore, it is possible that the lamp and the picture frame, and the questions related to those articles, are in connection with the context of decorating the living area. As can be seen, simply sharing a screen capture image is often insufficient, and requires further efforts on the part of the sender and the receiver to communicate additional information relating to the image or the context in which the image was captured and shared.

The illustrative embodiments recognize that the presently available tools or solutions do not address these needs or provide adequate solutions for these needs. The illustrative embodiments used to describe the invention generally address and solve the above-described problems and other problems related to screen capture data amalgamation.

An embodiment can be implemented as a software application. The application implementing an embodiment can be configured as a modification of an existing messaging channel or an imaging system, as a separate application that operates in conjunction with an existing messaging channel or an imaging system, a standalone application, or some combination thereof.

An embodiment takes or receives a screen capture image of all or a portion of data source's data that is presented on a screen of the device where the embodiment is executing. An embodiment identifies a context in which the screen capture image has been taken.

The identification of the context can take any one or more of the following forms—In one case, the sender user, i.e., the user who captures the screen capture image, may have certain interests. For example, the sender user may be Jane Doe may be an interior decorator, who may be interested in interior decoration, lighting, and other appliances and fixtures. As another example, another user may be a photographer who may be interested in photographs, printed art, framed pictures, and the like. Accordingly, one embodiment analyzes the data available about the sender user, e.g., from past communications of the sender with one or more other users, to determine the sender user's interests. Any one or more of the determined interests is usable as a context.

In another case, the sender may have been previously engaged in a conversation with another user over a messaging channel. As an example, a topic of discussion in the historical messages between the sender and the other user may be interior decoration of a living space. The sender may be engaged in another conversation with a different user about, say, aviation-related topics. Any one or more of the determined topics is usable as a context. When an embodiment analyzes a screen capture image to determine objects or themes that might be present in the screen capture image, the embodiment correlates the determined objects or themes with a context of a communication. An embodiment uses the topic that relates to the object or theme of the screen capture image as a context. The embodiment uses the context to also identify a likely receiver of the screen capture image.

In another case, the sender may have already selected a receiving user for the screen capture image. another embodiment analyzes a previous conversation with the identified receiver user over a messaging channel. As an example, a topic of discussion in the historical messages between the sender and the receiver user may be interior decoration of a living space. One or more of the determined topics is usable as a context. When an embodiment analyzes a screen capture image to determine objects or themes that might be present in the screen capture image, the embodiment correlates the determined objects or themes with a context of a communication. An embodiment uses the topic that relates to the object or theme of the screen capture image as a context.

Any number of contexts may apply to a screen capture image. Any number of messaging channels may provide the historical messaging data. Any number of likely recipients of the screen capture image may be identified.

An embodiment further associates a confidence value or confidence weight with a context determination, a likely receiver determination, or both. Any known method of cognitive analysis of the screen capture image and the historical messaging data can be used to compute the confidence value. The data of the actual messaging that occurs between the sender and a receiver subsequent to sending the screen capture image can be used as feedback in any known machine-learning methodology to train or improve the training of said cognitive analysis method.

Prior to sending the screen capture image, and after a context has been established for a screen capture image, an embodiment analyzes the presented data of the data source from which the screen capture image was created. Particularly, the embodiment analyzes the presented data to identify additional information in other portions of the presented data—which are not included in the screen capture image—the information being related to the context.

For instance, in the example context of decorating a living space, things have to be bought to decorate the living space. Accordingly, a price of an object that is usable in the decorating and that is present in the screen capture image is an additional information that is related to the context. The presented data may have a textual description of the example lamp described herein, and a pricing information may be found in the textual description.

Operating in this manner, the embodiment identifies some additional information that is related to the context. The embodiment populates the metadata of the screen capture image with the identified additional information.

An embodiment sends the metadata with the screen capture image, or causes the sending of the metadata with the screen capture image, when the screen capture image is actually sent to a receiver over a messaging channel. For example, if the messaging channel is an instant messaging app, the embodiment causes the metadata to be communicated to the receiver together with, or soon after, the message containing the screen capture image. Note that the determination of the additional information, associating the additional information with the screen capture image, and the sending of the additional information with the screen capture image are all performed without the intervention or action on the part of the sender.

Subsequent to the sending of the screen capture image and the metadata, the receiver may still have questions or may otherwise express a need for further information about the screen capture image. An embodiment analyzes such subsequent messaging between the receiver and the sender. The embodiment identifies a new topic or context of the subsequent messaging. In a manner described herein, the embodiment further analyzes the presented data from which the screen capture image was created. This further analysis is performed to identify additional information that relates to the new context.

An embodiment associates the additional information relating to the new context as additional metadata with the screen capture image. The embodiment sends or causes the sending of the additional metadata automatically in the subsequent messaging in a manner described herein.

The manner of screen capture data amalgamation described herein is unavailable in the presently available methods. A method of an embodiment described herein, when implemented to execute on a device or data processing system, comprises substantial advancement of the functionality of that device or data processing system in automatically determining a need for additional contextual information related to a screen capture image, and automatically supplying such additional information in a communication where the screen capture image is sent. The determining and sending can be ongoing during a conversation related to the screen capture image.

The illustrative embodiments are described with respect to certain types of data source, presented data and portions thereof, screen capture image, topics, objects, contexts, analyses, values and weights, messages, messaging channels, additional information, metadata, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device or wireless device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
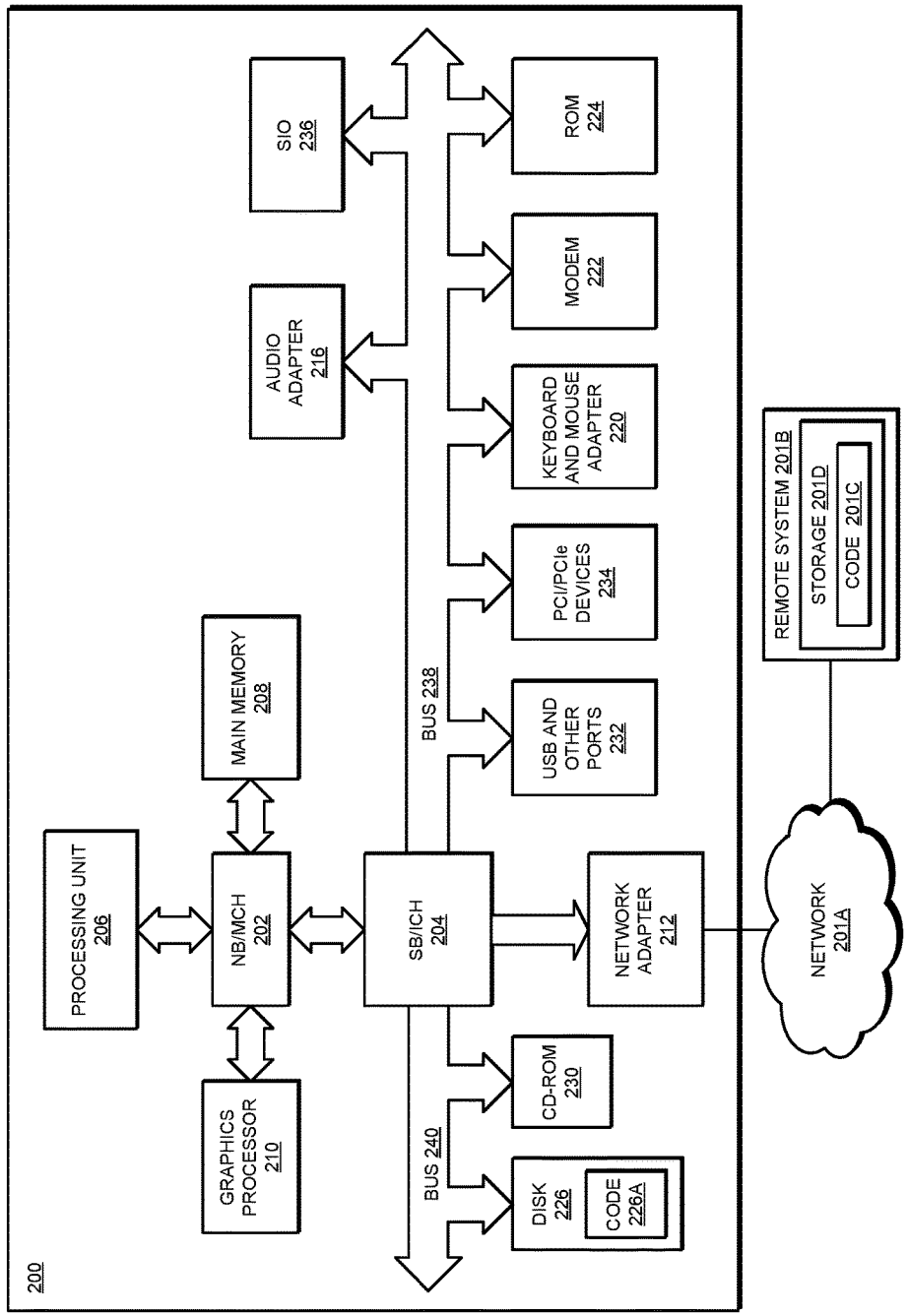
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Client 114 is usable by a sender user to send a screen capture image in a manner described herein. Application 115 implements an embodiment described herein. Application 115 interacts with messaging application 116 to perform one or more operations described herein. Data source 107 provides presented data on client 114, using which the screen capture image is created on client 114, and using which application 115 constructs the metadata of the screen capture image as described herein. The embodiments can be implemented on any type of device usable for communicating using a messaging channel. For example, device 132 can be configured in a manner similar to client 114, where application 134 and messaging application 136 perform functions similar to application 115 and messaging application 116, respectively. Data source 107 presents data on device 132 in a manner similar to the presented data on client 114.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 115 or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
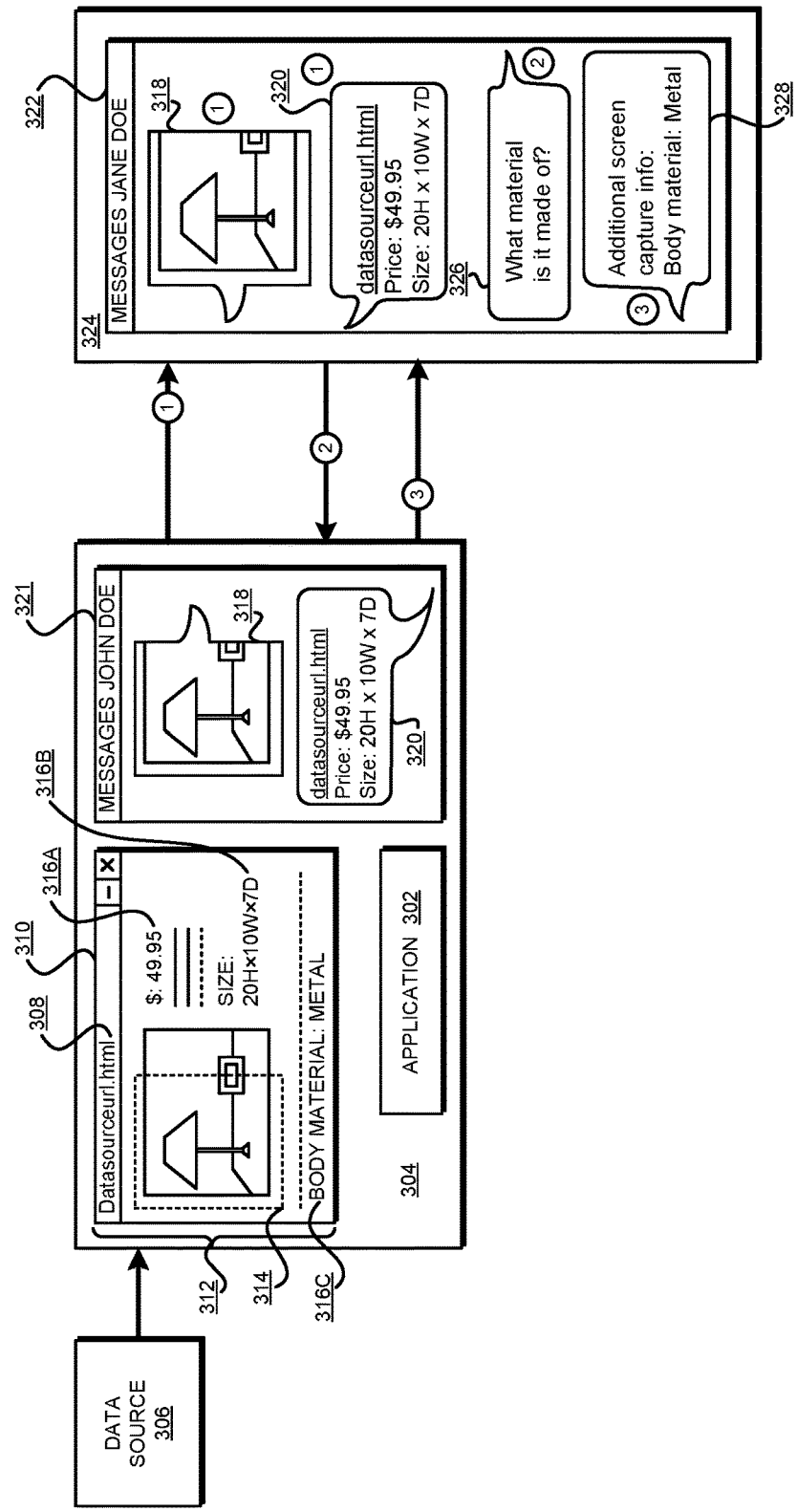
FIG. 3 depicts a block diagram of an example configuration for screen capture data amalgamation in accordance with an illustrative embodiment.

With reference to FIG. 3, this figure depicts a block diagram of an example configuration for screen capture data amalgamation in accordance with an illustrative embodiment. Application 302 is an example of application 115 or 134 in FIG. 1, and accordingly, data processing system 304 corresponds to client 114 or device 132, respectively, in FIG. 1. Data source 306 is an example of data source 107 in FIG. 1.

Only as a non-limiting example for the clarity of the description, suppose that data source 306 presents data using URL 308 in browser 310. The body of browser 310 contains presented data 312. Further suppose that a screen capture operation captures portion 314 of presented data 312 as a screen capture image. The remaining portion of presented data 312—which is the portion of presented data 312 other than the portion captured in the screen capture image—may fully or partially be visible in the body of browser 310. For example, some of the remaining portion may be reachable in the body of browser 310 by scrolling. Information 316A (price of an article depicted in presented data 312), information 316B (size of the article depicted in presented data 312), and information (construction material of the article depicted in presented data 312) are some examples of information available in the remaining portion of presented data 312.

In any of the manners described herein, application 302 determines a context associated with the screen capture image captured from portion 314. As an example, application 302 analyzes the remaining portion and determines that information 316A and 316B are related to the context. Accordingly, application 302 populates screen capture image 318 with information 316A and 316B. Application 302 then causes the metadata to be sent in conjunction with screen capture image 318 in the form of message 320.

Thus, as a part of communication 1 (labelled with circled 1), application 302 causes screen capture image 318 and metadata 320 to be sent from messaging channel 321 operating in data processing system 304 of the sender user, to messaging channel 322 operating in data processing system 324 of a receiver user. Metadata 320 automatically provided in communication 1 may satisfy the receiver user's need for additional information related to screen capture image 318.

In one example case described herein, the receiver user may need more information about screen capture image 318. For example, the receiver user may send communication 2 (labelled with circled 2) to the sender user's system 304. Communication 2 includes message 326 (shown only in the receiver-side messaging channel 322 and not in sender-side messaging channel 321 for clarity).

As a result of receiving communication 2 at data processing system 304, application 302 performs an analysis of message 326 to compute a new or additional context. In the depicted example, suppose that the additional context is "material". Using the additional context, application 302 extracts additional information 316C from the remaining portion of presented data 312. Application 302 causes additional information 316C to be associated as additional metadata with screen capture image 318. Application 302 causes the additional metadata to be sent as communication 3 (labelled with circled 3). In the depicted non-limiting example, communication 3 appears as additional message 328 in messaging channel 322.

Note that the browser-method of presenting data, the scrolling method of reaching various parts of the remaining portion, presenting the metadata as one or more separate messages, and other depicted operations are used only as non-limiting example ways of accomplishing certain operations described herein. From this disclosure, those of ordinary skill in the art will be able to conceive many other ways of accomplishing these operations and the same are contemplated within the scope of the illustrative embodiments. For example, presented data 312 may be loaded in a document editor instead of a browser, the remaining portion may be paginated instead of scrollable, and the metadata may be shown and presented in a messaging channel in or with the screen capture image instead of a separate message.

Figure 4:
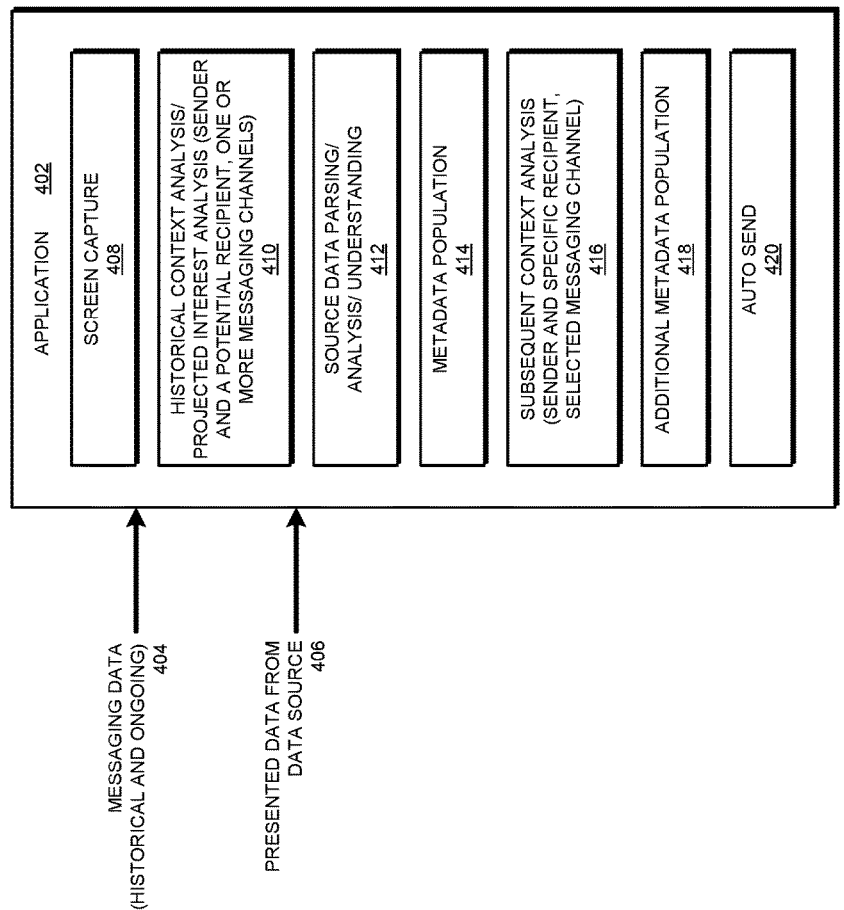
FIG. 4 depicts a block diagram of another example configuration for screen capture data amalgamation in accordance with an illustrative embodiment.

With reference to FIG. 4, this figure depicts a block diagram of another example configuration for screen capture data amalgamation in accordance with an illustrative embodiment. Application 402 is an example of application 302 in FIG. 3. Messaging data 404 is data obtained from the messaging channel, such as messaging channel 321 in FIG. 3, used by the sender user for communicating with one or more other users. Note that more than one messaging channels may provide messaging data 404. Presented data 406 is an example of presented data 312 in FIG. 3.

A screen capture image may be created by component 408 or another component operating outside application 402. Component 410 analyzes historical messaging data to extract one or more contexts as described herein. For example, an extracted context may be a topic that the sender is expected to be interested in, with a certain confidence value. As another example, an extracted context may be a topic that the sender and an expected receiver are likely to be interested in, with a certain confidence value. As another example, an extracted context may be a topic that the sender and an identified receiver are determined to have been interested in, with a certain confidence value.

Component 412 parses, analyzes, or otherwise performs machine understanding of the remaining portion of presented data 406, i.e. the portion other than the portion included in the screen capture image. Using this machine understanding of the remaining portion, component 412 identifies in presented data 406 one or more pieces of additional information related to the screen capture image.

Component 414 suitably associates the identified pieces of additional information with the screen capture image. One non-limiting manner of associating the identified pieces of additional information with the screen capture image includes making the additional information a part of the metadata of the screen capture image. The association between the additional information and the screen capture image can be formed in ways other than the image metadata, such as by embedding the information in the image graphic, or including the information in a file that is separate from the file containing the image data.

Component 420 causes the additional information to be sent in conjunction with the screen capture image in a messaging channel. If subsequent messaging occurs in the messaging channel, component 418 analyses the subsequent messaging data to determine additional context as described herein. If more or different additional information is needed according to the additional context, component 416 uses component 412 to extract such more or different pieces of additional information. Component 418 operates in the manner of component 414 to associate the more or different pieces of additional information with the screen capture image. Component 420 communicates the more or different pieces of additional information in the messaging channel.

Figure 5:
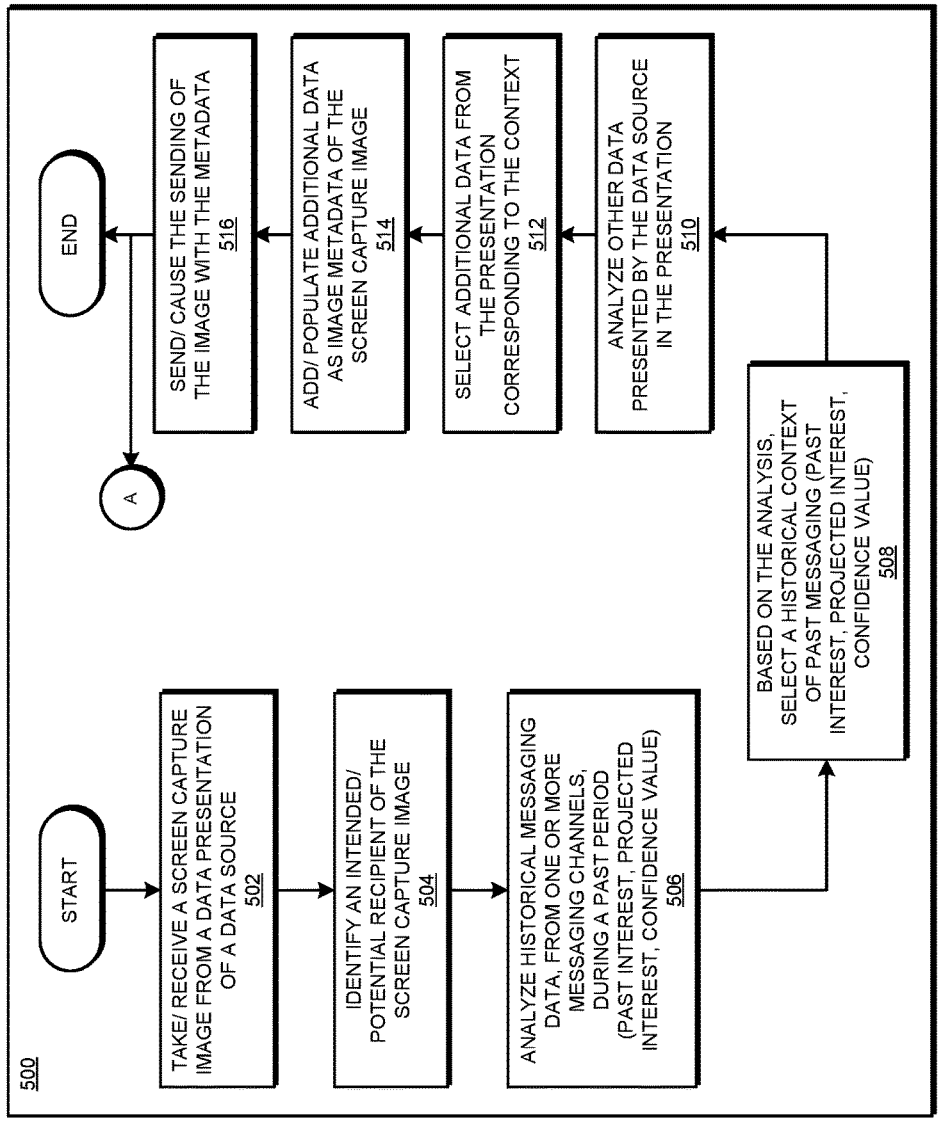
FIG. 5 depicts a flowchart of an example process for screen capture data amalgamation in accordance with an illustrative embodiment.

With reference to FIG. 5, this figure depicts a flowchart of an example process for screen capture data amalgamation in accordance with an illustrative embodiment. Process 500 can be implemented in application 402 in FIG. 4.

The application takes or receives a screen capture image from a data presentation of a data source, e.g., presented data 406 in FIG. 4 (block 502). The application identifies a likely or actual recipient of the screen capture image as the case may be, in a manner described herein (block 504).

The application analyzes historical messaging data from a past period in one or more messaging channels to determine a set of contexts and a corresponding set of their confidence values as described herein (block 506). The application selects a historical context computed in the analysis of block 506 (block 508). For example, the application may select that historical context which has the highest confidence value, or the application may select a context whose confidence value exceeds a threshold confidence value. Other methods for selecting a context based on the confidence values will be apparent from this disclosure to those of ordinary skill in the art and the same are contemplated within the scope of the illustrative embodiments.

The application analyzes the remaining portion of the presented data in a manner described herein (block 510). From the analysis of block 510, the application selects one or more pieces of additional data that correspond to the selected context (block 512). The application adds or populates the additional information as metadata of the screen capture image, or associates the additional information with the screen capture image in other suitable manner (block 514).

The application sends or causes the sending of the additional information with the screen capture image to a receiver (block 516). The application either ends process 500 thereafter or exits process 500 via exit point label "A" to enter process 600 via entry point labelled "A" therein.

Figure 6:
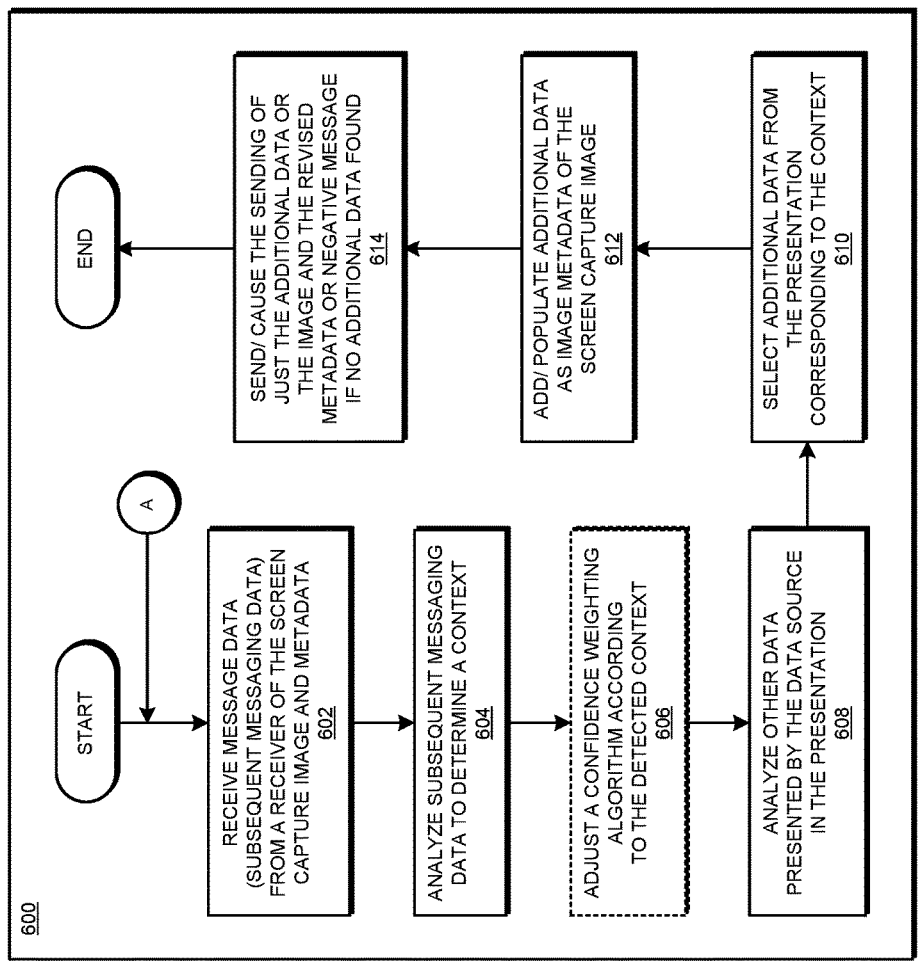
FIG. 6 depicts a flowchart of another example process for screen capture data amalgamation in accordance with an illustrative embodiment.

With reference to FIG. 6, this figure depicts a flowchart of another example process for screen capture data amalgamation in accordance with an illustrative embodiment. Process 600 can be implemented in application 402 in FIG. 4. The application optionally enters process 600 from process 500 of FIG. 5 via entry point A.

The application receives or detects receiving subsequent message data after sending the screen capture image and additional information from process 500 (block 602). The application analyzes the subsequent message data to determine an additional context as described herein (block 604). Optionally, as a result of identifying additional context in the analysis of block 604, the application may adjust or modify a confidence weighting algorithm in a cognitive analysis system as described herein (block 606).

The application analyzes the remaining portion of the presented data to find further additional information that is related to the additional context (block 608). The application selects the further additional information corresponding to the context, if such information is found in the presented data (block 610).

The application adds or populates the further additional information as additional metadata of the screen capture image, or associates the further additional information with the screen capture image in other suitable manner (block 612).

The application sends or causes the sending of the further additional information in relation to the screen capture image in the messaging channel (block 614). If no further additional information is found, the application may optionally cause the sending of a negative result message advising the receiver that no additional information relating to the additional context was found in the presented data. The application ends process 600 thereafter.

Thus, a computer implemented method, system or apparatus, and computer program product are provided in the illustrative embodiments for screen capture data amalgamation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   capturing, at a device of a sender, from a first portion of data presented on the device by a data source, a screen capture image;
   analyzing historical messaging data, the historical messaging data comprising communications of the sender in a messaging channel, the messaging channel comprising a system for electronic communication, to extract a context, the context comprising a topic selected from a set of topics within the historical messaging data in which the sender has participated;
   searching, using the context, a second portion of the data presented on the device by the data source, the second portion comprising data not captured in the screen capture image;
   extracting, responsive to the searching, an additional information from the second portion, the additional information related to the context;
   associating the additional information with the screen capture image; and
   causing the screen capture image and the additional information to be transmitted in the messaging channel.

2. The method of claim 1, further comprising:
   detecting, responsive to the causing, a subsequent communication in the messaging channel;
   analyzing data of the subsequent communication to extract a second context;
   searching, using the second context, the second portion to locate a second additional data, the second additional data corresponding to the second context;
   associating the second additional information with the screen capture image; and
   causing the second additional information to be transmitted relative to the screen capture image in the messaging channel.

3. The method of claim 1, further comprising:
   detecting, responsive to the causing, a subsequent communication in the messaging channel;
   analyzing data of the subsequent communication to extract a second context;
   searching, using the second context, the second portion to locate a second additional data, the second additional data corresponding to the second context;
   failing to locate the second additional information in the second portion; and
   causing a message about the failing to be transmitted relative to the screen capture image in the messaging channel.

4. The method of claim 1, further comprising:
   adding, as a part of the associating, the additional information as metadata of the screen capture image.

5. The method of claim 1, further comprising:
   modifying, as a part of the associating, the screen capture image to embed the additional information into the screen capture image.

6. The method of claim 1, further comprising:
   determining from analyzing the historical messaging data, a likely receiver of the screen capture image; and
   selecting the topic from the set of topics responsive to the sender communicating with the likely receiver about the topic in the historical messaging data.

7. The method of claim 1, further comprising:
   identifying a specified receiver of the screen capture image; and
   selecting the topic from the set of topics responsive to the sender communicating with the specified receiver about the topic in the historical messaging data.

8. The method of claim 1, wherein the first portion of the data is visibly presented on a display screen associated with the device, and wherein the second portion is available at the device.

9. The method of claim 8, wherein the second portion is not visible on the device.

10. The method of claim 1, further comprising:
    computing a past period of time, wherein the historical messaging data was communicated within the past period.

11. A computer usable program product comprising one or more non-transitory computer-readable storage devices, and program instructions stored on at least one of the one or more storage devices, the stored program instructions comprising:
    program instructions to capture, at a device of a sender, from a first portion of data presented on the device by a data source, a screen capture image;
    program instructions to analyze historical messaging data, the historical messaging data comprising communications of the sender in a messaging channel, the messaging channel comprising a system for electronic communication, to extract a context, the context comprising a topic selected from a set of topics within the historical messaging data in which the sender has participated;
    program instructions to search, using the context, a second portion of the data presented on the device by the data source, the second portion comprising data not captured in the screen capture image;
    program instructions to extract, responsive to the searching, an additional information from the second portion, the additional information related to the context;
    program instructions to associate the additional information with the screen capture image; and
    program instructions to cause the screen capture image and the additional information to be transmitted in the messaging channel.

12. The computer usable program product of claim 11, further comprising:
    program instructions to detect, responsive to the causing, a subsequent communication in the messaging channel;
    program instructions to analyze data of the subsequent communication to extract a second context;
    program instructions to search, using the second context, the second portion to locate a second additional data, the second additional data corresponding to the second context;
    program instructions to associate the second additional information with the screen capture image; and
    program instructions to cause the second additional information to be transmitted relative to the screen capture image in the messaging channel.

13. The computer usable program product of claim 11, further comprising:
    program instructions to detect, responsive to the causing, a subsequent communication in the messaging channel;

program instructions to analyze data of the subsequent communication to extract a second context;
program instructions to search, using the second context, the second portion to locate a second additional data, the second additional data corresponding to the second context;
program instructions to fail to locate the second additional information in the second portion; and
program instructions to cause a message about the failing to be transmitted relative to the screen capture image in the messaging channel.

14. The computer usable program product of claim 11, further comprising:
program instructions to add, as a part of the associating, the additional information as metadata of the screen capture image.

15. The computer usable program product of claim 11, further comprising:
program instructions to modify, as a part of the associating, the screen capture image to embed the additional information into the screen capture image.

16. The computer usable program product of claim 11, further comprising:
program instructions to determine from analyzing the historical messaging data, a likely receiver of the screen capture image; and
program instructions to select the topic from the set of topics responsive to the sender communicating with the likely receiver about the topic in the historical messaging data.

17. The computer usable program product of claim 11, further comprising:
program instructions to identify a specified receiver of the screen capture image; and
program instructions to select the topic from the set of topics responsive to the sender communicating with the specified receiver about the topic in the historical messaging data.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more non-transitory computer-readable storage devices, and program instructions stored on at least one of the one or more storage devices for execution by at least one of the one or more processors via at least one of the one or more memories, the stored program instructions comprising:
program instructions to capture, at a device of a sender, from a first portion of data presented on the device by a data source, a screen capture image;
program instructions to analyze historical messaging data, the historical messaging data comprising communications of the sender in a messaging channel, the messaging channel comprising a system for electronic communication, to extract a context, the context comprising a topic selected from a set of topics within the historical messaging data in which the sender has participated;
program instructions to search, using the context, a second portion of the data presented on the device by the data source, the second portion comprising data not captured in the screen capture image;
program instructions to extract, responsive to the searching, an additional information from the second portion, the additional information related to the context;
program instructions to associate the additional information with the screen capture image; and
program instructions to cause the screen capture image and the additional information to be transmitted in the messaging channel.

* * * * *